United States Patent
Jayaraman et al.

(10) Patent No.: US 9,113,390 B2
(45) Date of Patent: Aug. 18, 2015

(54) PROTECTING PACKET TRAFFIC IN A NETWORK INCLUDING AN ADAPTIVE BANDWIDTH LINK

(71) Applicants: Kannan Jayaraman, Karnataka (IN); Samer Salam, Vancouver (CA); Shwetha Subray Bhandari, Karnataka (IN); Jose A. Liste, Sunnyvale, CA (US)

(72) Inventors: Kannan Jayaraman, Karnataka (IN); Samer Salam, Vancouver (CA); Shwetha Subray Bhandari, Karnataka (IN); Jose A. Liste, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 200 days.

(21) Appl. No.: 14/029,600

(22) Filed: Sep. 17, 2013

(65) Prior Publication Data

US 2015/0029948 A1  Jan. 29, 2015

(30) Foreign Application Priority Data

Jul. 29, 2013 (IN) ............................ 2257/DEL/2013

(51) Int. Cl.
*H04L 12/26* (2006.01)
*H04W 40/02* (2009.01)

(52) U.S. Cl.
CPC ..................................... *H04W 40/02* (2013.01)

(58) Field of Classification Search
CPC ................. H04L 47/10–47/18; H04L 47/122; H04L 47/125
USPC ................................. 370/253–253, 217–245
See application file for complete search history.

(56) References Cited

U.S. PATENT DOCUMENTS

| | | | |
|---|---|---|---|
| 7,146,098 B1 | 12/2006 | Warbrick | |
| 7,333,438 B1* | 2/2008 | Rabie et al. | 370/242 |
| 7,889,652 B1* | 2/2011 | Minei et al. | 370/230 |
| 2004/0098485 A1* | 5/2004 | Larson et al. | 709/227 |
| 2006/0245357 A1* | 11/2006 | Ilan | 370/235 |
| 2010/0098034 A1* | 4/2010 | Tang et al. | 370/338 |
| 2011/0164501 A1* | 7/2011 | Dunbar | 370/236.2 |
| 2013/0188478 A1* | 7/2013 | Kayser | 370/228 |
| 2014/0133294 A1* | 5/2014 | Horn et al. | 370/230 |

(Continued)

OTHER PUBLICATIONS

Dubey and Patel, "An Improved routing efficiency for WiMAX Network using Random 2D direction model in NS3 simulator"; International Journal of Engineering Research and Applications (IJERA) ISSN: 2248-9622, vol. 2, Issue 5, Sep.-Oct. 2012, pp. 420-424.*

(Continued)

*Primary Examiner* — Thai Hoang
(74) *Attorney, Agent, or Firm* — The Law Office of Kirk D. Williams (57) ABSTRACT

In one embodiment, a packet switching device receives a notification that a link has a diminished packet transport capacity. In response, the packet switching devices changes forwarding information for a portion of the packet traffic being sent over the diminished packet transport capacity link to traverse one or more reroute paths not including the diminished link, while some packet traffic continues to use the diminished packet transport capacity link. This notification can be received directly from a communications device, or via a routing protocol such as for a remote link that sent packet traffic may traverse. These rerouted paths may be precomputed and installed in forwarding data structures for fast rerouting, or computed and installed in response to receiving the notification. In one embodiment, quality of service (QoS) is adjusted in response to receiving the notification.

20 Claims, 4 Drawing Sheets

(56) References Cited

U.S. PATENT DOCUMENTS

2014/0160939 A1* 6/2014 Arad et al. .................... 370/237
2014/0286173 A1* 9/2014 Bhandari et al. .............. 370/238
2014/0341037 A1* 11/2014 Racz et al. .................... 370/235
2014/0341042 A1* 11/2014 Racz et al. .................... 370/237
2014/0355447 A1* 12/2014 Gohite et al. ................. 370/236

OTHER PUBLICATIONS

Carvalho et al, "A Mobile WiMAX Mesh Network with Routing Techniques and Quality of Service Mechanisms." Issue 2013.*

Anwar et al, "Performance Analysis of Ad hoc Routing Protocols in Mobile WiMAX Environment." IAENG International Journal of Computer Science, Aug. 21, 2008.*

Katz et al., "Traffic Engineering (TE) Extensions to OSPF Version 2," RFC 3630, Sep. 2003, The Internet Society, Reston, VA, USA (fourteen pages).

Shand et al., "IP Fast Reroute Framework," RFC 5714, Jan. 2010, The Internet Society, Reston, VA, USA (fifteen pages).

Bryant et al., "Remote LFA FRR," draft-ietf-rtgwg-remote-lfa-02, May 23, 2013, The Internet Society, Reston, VA, USA (fifteen pages).

Previdi et al., "IS-IS Traffic Engineering (TE) Metric Extensions," draft-previdi-isis-te-metric-extensions-03, Feb. 25, 2013, The Internet Society, Reston, VA, USA (fourteen pages).

"Microwave ACM Signaling and EEM Integration," Cisco ASR 901 Series Aggregation Services Router Software Configuration Guide, Mar. 2013, Cisco Systems, Inc., San Jose, CA, USA (eighteen pages).

* cited by examiner

PROTECTING PACKET TRAFFIC IN A NETWORK INCLUDING AN ADAPTIVE BANDWIDTH LINK

CROSS-REFERENCE TO RELATED APPLICATIONS

This application claims priority to India Patent Application 2257/DEL/2013, filed Jul. 29, 2013, which is hereby incorporated by reference in its entirety.

TECHNICAL FIELD

The present disclosure relates generally to forwarding packets in a communications network using an adaptive bandwidth link (e.g., microwave link).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Mobile Service Providers often connect cell site packet switching devices at the access layer via microwave links. These microwave links are susceptible to interference, such as that caused by weather conditions.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with protecting packet traffic in a network including an adaptive bandwidth link. In one embodiment, a packet switching device of a network receives a notification that an adaptive bandwidth microwave link has a diminished packet transport capacity. In response to this received notification, the packet switching device changes forwarding information for a first portion of the packet traffic (that was previously destined to go over the adaptive bandwidth microwave link) to traverse one or more reroute paths not including the adaptive bandwidth microwave link. The first portion of the packet traffic is forwarded on a path that traverses the one or more reroute paths not including the adaptive bandwidth microwave link based on said changed forwarding information, while a different portion of packet traffic is still forwarded over a path including the adaptive bandwidth microwave link.

One embodiment includes a packet switching device, comprising: one or more processing elements; memory; a plurality of interfaces configured to send and receive packets; and one or more packet switching mechanisms configured to packet switch packets among said interfaces. These one or more processing elements are configured to perform operations, which include: in response to a received notification that a link has a diminished packet transport capacity, changing forwarding information for a first portion of the packet traffic to forward packet traffic previously destined to go over the diminished link to traverse one or more reroute paths not including the diminished link, with forwarding information remaining to continue to forward a different portion of the packet traffic over one or more paths including the diminished link. Additionally, one or more interfaces of the plurality of interfaces are configured to forward the first portion of the packet traffic based on said changed forwarding information to traverse said one or more reroute paths not including the diminished link, with forwarding information remaining to continue to forward a different portion of the packet traffic over one or more paths including the diminished link.

2. Description

Disclosed are, inter alia, methods, apparatus, computer-storage media, mechanisms, and means associated with protecting packet traffic in a network including an adaptive bandwidth link. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

The term "diminished packet transport capacity" is used herein to refer to a reduced capacity to continue transport packets (e.g., not a complete link failure loosing connectivity and is still able to carry some packet traffic).

For example, microwave links are characterized with the capability to reduce their bandwidth due to fading conditions (e.g. rain or fog), as opposed to completely losing connectivity. The radios which support Adaptive Coding and Modulation (ACM) can report the most up to date bandwidth information to directly connected packet switching devices via ITU-T G.8013/Y.1731 messages. In one embodiment, this information about the capacity of the link is flooded throughout the network, such as, but not limited to, using a routing protocol [e.g., an interior gateway protocol, Intermediate System to Intermediate System (IS-IS), Open Shortest Path First (OSPF).]

In response to receiving this information directly from a communications device or via flooded information, a packet switching device in one embodiment adjusts its routing policies to reroute some packet traffic away from faded microwave or other diminished capacity link(s), and return the packet traffic when the bandwidth increases or returns to a normal level. In one embodiment, a packet switching device takes quality of service (QoS) action(s) (e.g., adjusting its scheduling or policing) in response to the notification of the diminished capacity link(s) or their return to normal operating levels as the rerouting of packet traffic will affect other portions of the network. These responsive packet switching device(s) may be adjacent to the communications device reporting the diminished capacity link, or anywhere in the network having received this information in a routing protocol or other message.

One embodiment allows for rerouting a portion of the traffic away from a diminished capacity link and/or adjusting QoS actions based on one or more prefixes (which includes IP prefixes and subnets), such that a different portion can continue to use the diminished capacity link. For example, one embodiment reroutes best effort and/or other lower-priority packet traffic away from the diminished capacity link as this traffic might otherwise be dropped due to the change in capacity of the link. One embodiment reroutes high-priority packet traffic away from the diminished capacity link. In one embodiment, the other packet traffic continues to follow the normal paths (which may include traversing the diminished capacity link).

One embodiment includes a method, comprising: receiving, by a packet switching device of a network, a notification that an adaptive bandwidth microwave link has a diminished packet transport capacity; in response to said received notification, changing forwarding information within the packet switching device for a first portion of the packet traffic previously destined to go over the adaptive bandwidth microwave link to traverse one or more reroute paths not including the adaptive bandwidth microwave link; and forwarding, by the packet switching device, the first portion of the packet traffic to traverse said one or more reroute paths not including the adaptive bandwidth microwave link based on said changed forwarding information, while continuing to forward a different portion of packet traffic over the adaptive bandwidth microwave link.

In one embodiment, the notification is directly received from a microwave communications device. In one embodiment, the notification is received using ITU-T G.8013/Y.1731 protocol. One embodiment includes in response to said received notification, sending the notification in one or more routing protocol message to one or more other packet switching devices in the network. In one embodiment, the notification is received in a routing protocol message flooded through the network. In one embodiment, the routing protocol is an interior gateway protocol (IGP). In one embodiment, the routing protocol is Intermediate System to Intermediate System (IS-IS) or Open Shortest Path First (OSPF). One embodiment includes adjusting one or more Quality of Service (QoS) policies based on said received notification. In one embodiment, the first portion of the packet traffic does not include any high priority packet traffic. In one embodiment, the first portion of the packet traffic includes best effort packet traffic. One embodiment includes predetermining said one or more reroute paths prior to said receiving the notification. In one embodiment, the first portion of the packet traffic is identified by one or more prefixes (e.g., fully specified prefixes or subnets).

One embodiment includes a packet switching device, comprising: one or more processing elements; memory; a plurality of interfaces configured to send and receive packets; and one or more packet switching mechanisms configured to packet switch packets among said interfaces; wherein said one or more processing elements are configured to perform operations, including in response to a received notification that a link has a diminished packet transport capacity, changing forwarding information for a first portion of the packet traffic to forward packet traffic previously destined to go over the diminished link to traverse one or more reroute paths not including the diminished link, with forwarding information remaining to continue to forward a different portion of the packet traffic one or more paths including the diminished link; and wherein one or more interfaces of the plurality of interfaces are configured to forward the first portion of the packet traffic based on said changed forwarding information to traverse said one or more reroute paths not including the diminished link, and to forward the different portion of the packet traffic over said one or more paths including the diminished link.

In one embodiment, the diminished link is an adaptive bandwidth microwave link. In one embodiment, the notification was directly received from a microwave communications device. In one embodiment, the notification was received in a routing protocol message flooded through the network. In one embodiment, the first portion of the packet traffic does not include any high priority packet traffic. In one embodiment, said operations include: predetermining said one or more reroute paths prior to said received notification being received by the packet switching device.

One embodiment includes one or more non-transitory media encoding logic that includes instructions for execution, which when executed by a processor is operable to perform operations, comprising: predetermining one or more reroute paths not including an adaptive bandwidth microwave link; in response to a received notification that the adaptive bandwidth microwave link has a diminished packet transport capacity, changing forwarding information for a first portion of the packet traffic to forward packet traffic previously destined to go over the adaptive bandwidth microwave link to traverse a path of said one or more reroute paths, with forwarding information remaining to continue to forward a different portion of the packet traffic over the adaptive bandwidth microwave link.

Figure 1:
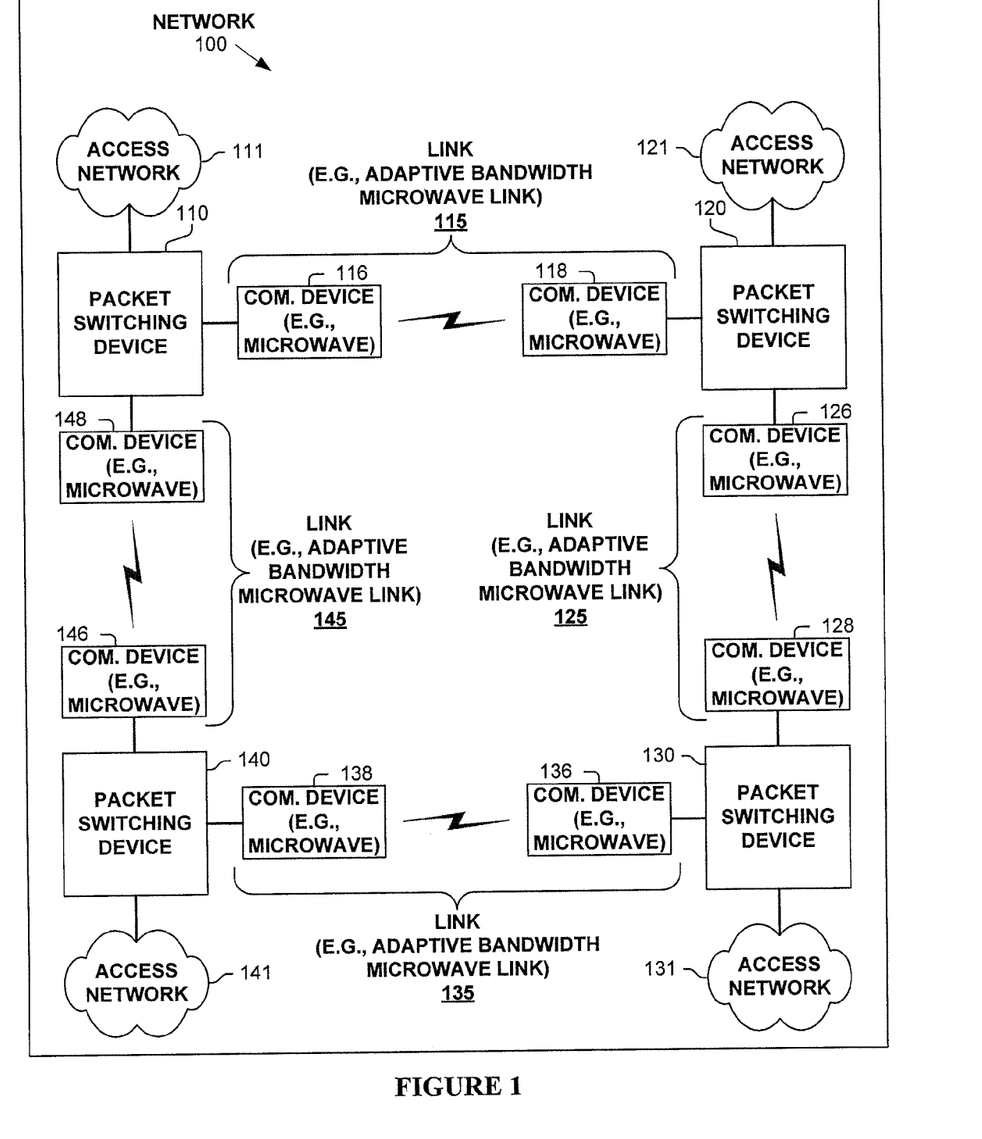
FIG. 1 illustrates a network operating according to one embodiment.

Turning to the figures, FIG. 1 illustrates a network 100 operating according to one embodiment. As shown, network 100 includes four packet switching devices 110, 120, 130, 140 configured in a ring topology using links 115, 125, 135, 145 (e.g., microwave, optical and/or electrical one or more bundled links or channels) provided by communications devices 116-118, 126-128, 136-138, and 146-148. Each of packet switching devices 110, 120, 130, 140 is attached to an access network 111, 121, 131, 141 as shown. One embodiment operates in a different network topology and configuration. Network 100 simply provides an example network for describing the operation of one embodiment. In one embodiment, communications devices 116-118, 126-128, 136-138, and 146-148 are included in packet switching devices 110, 120, 130, 140.

In one embodiment, packet switching device 120 forwards packets to packet switching device 130 over link 125. In response to link 125 having a diminished packet transport capacity, packet switching device 120 starts sending a first portion of this packet traffic over link 115 towards packet switching device 130, while continuing to use link 125 for a different portion of this packet traffic.

In one embodiment, packet switching device 110 forwards packets to packet switching device 130 over link 115 through packet switching device 120 and over link 125. In response to link 125 having a diminished packet transport capacity (e.g., a remote link to packet switching device 110), packet switching device 110 starts sending a first portion of this packet traffic over link 145 towards packet switching device 130, while continuing to use the path including link 125 for a different portion of this packet traffic.

In one embodiment, Interior Gateway Protocol with Traffic Engineering extensions (IGP-TE) is run in network 100 (e.g., by packet switching devices 110, 120, 130, 140), which allows the distribution of bandwidth information using type-length-value (TLV) and/or sub-TLV values (e.g., Residual Bandwidth sub-TLV). Communications devices 116-118, 126-128, 136-138, 146-148 provide their adjacent packet switching devices (110, 120, 130, 140) ITU-T G.8013/Y.1731 messages describing the bandwidth of links 115, 125, 135, 145 (e.g., maximum bandwidth, current bandwidth). The receiving packet switching device 110, 120, 130, 140 will flood this diminished packet transport capacity and/or other bandwidth capacity information (e.g., the A-bit of the Residual Bandwidth sub-TLV indicates whether or not the full bandwidth is available) to its neighbor packet switching device 110, 120, 130, 140 using IGP-TE.

In one embodiment, one or more packet switching devices 110, 120, 130, 140 avoid a diminished capacity link 115, 125, 135, 145, such as, but not limited to using IP fast reroute mechanisms, Loop-Free Alternate (LFA), Remote LFA, Multiprotocol Label Switching (MPLS) fast reroute mechanisms, L2 or L3 Traffic Engineering, and/or Segment Routing. In one embodiment, the alternative path(s) to reroute around a diminished packet transport capacity link 115, 125, 135, 145 are precomputed and installed in a forwarding data structure so that a first portion of the traffic can be quickly rerouted.

Figure 2A:
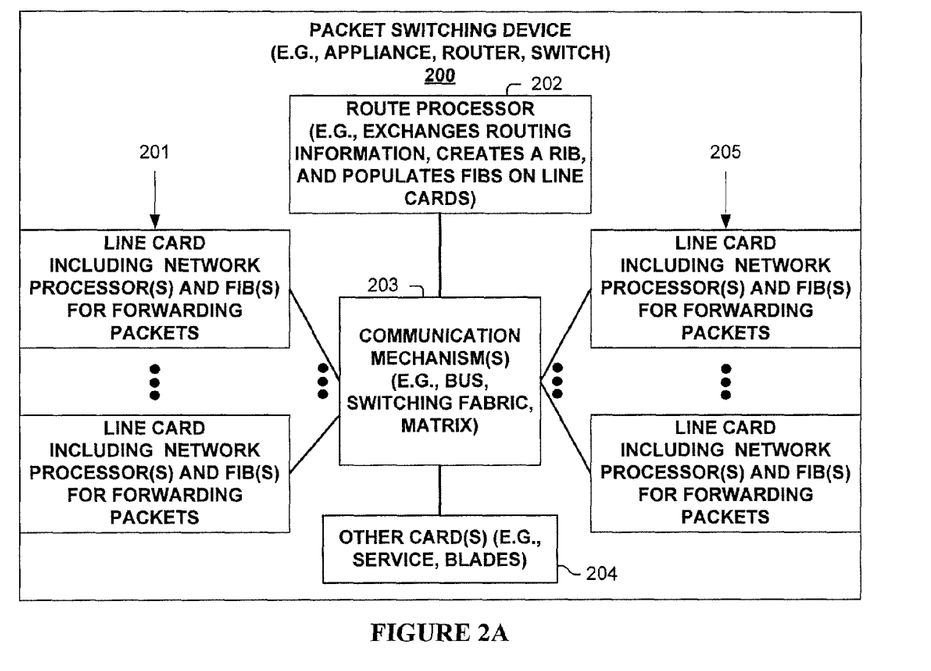
FIG. 2A illustrates a packet switching device according to one embodiment.

One embodiment of a packet switching device 200 (e.g., one example of a network node) is illustrated in FIG. 2A. As shown, packet switching device 200 includes multiple line cards 201 and 205, each with one or more network interfaces for sending and receiving packets over communications links, and with one or more processing elements that are used in one embodiment associated with protecting packet traffic in a network including an adaptive bandwidth link. Packet switching device 200 also has a control plane with one or more processing elements 202 for managing the control plane and/or control plane processing of packets associated with protecting packet traffic in a network including an adaptive bandwidth link. Packet switching device 200 also includes other cards 204 (e.g., service cards, blades) which include processing elements that are used in one embodiment to process packets associated with protecting packet traffic in a network including an adaptive bandwidth link, and some communication mechanism 203 (e.g., bus, switching fabric, matrix) for allowing its different entities 201, 202, 204 and 205 to communicate.

Figure 2B:
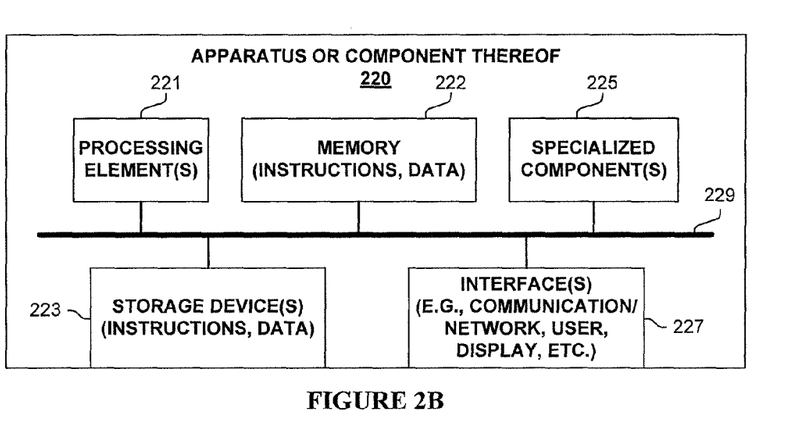
FIG. 2B illustrates an apparatus according to one embodiment.

FIG. 2B is a block diagram of an apparatus 220 used in one embodiment associated with protecting packet traffic in a network including an adaptive bandwidth link. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3A:
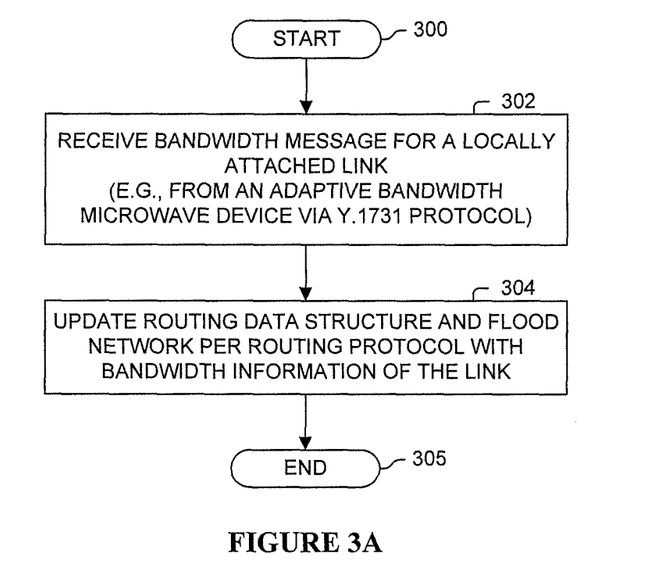
FIG. 3A illustrates a process according to one embodiment.

FIG. 3A illustrates a process performed in one embodiment by a packet switching device directly attached to a link having variable bandwidth. Processing begins in process block 300. In process block 302, a message is received from a communications device providing the link, with this message signaling bandwidth information corresponding to the link. In one embodiment, this message is an ITU-T G.8013/Y.1731 message received from an adaptive bandwidth microwave device). In process block 304, one or more routing data structures (e.g., a RIB) are updated and the network is flooded with this updated information per the routing protocol (e.g., IGP, OSPF, IS-IS). Processing of the flow diagram of FIG. 3A is complete as indicated by process block 305.

Figure 3B:
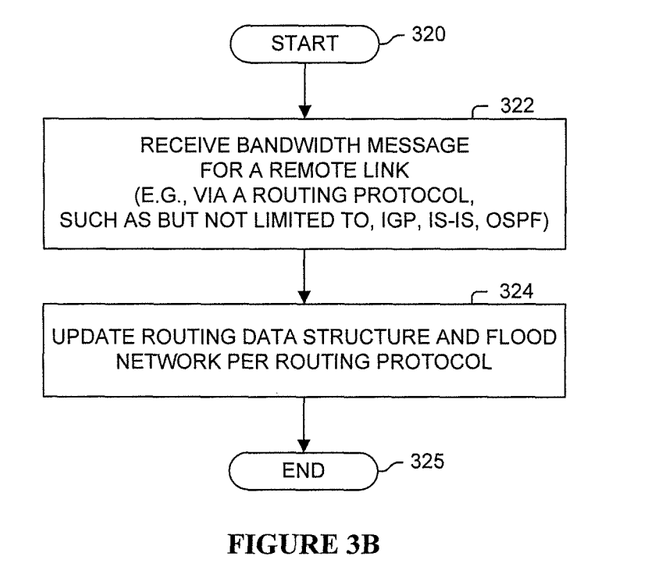
FIG. 3B illustrates a process according to one embodiment.

FIG. 3B illustrates a process performed in one embodiment by a packet switching device remote from a link having variable bandwidth. Processing begins in process block 320. In process block 322, a routing protocol message (e.g., IGP, OSPF, IS-IS) is received, with this message including bandwidth information for the remote link. In process block 324, one or more routing data structures (e.g., a RIB) are updated and the network is flooded with this updated information per the routing protocol. Processing of the flow diagram of FIG. 3B is complete as indicated by process block 325.

Figure 4:
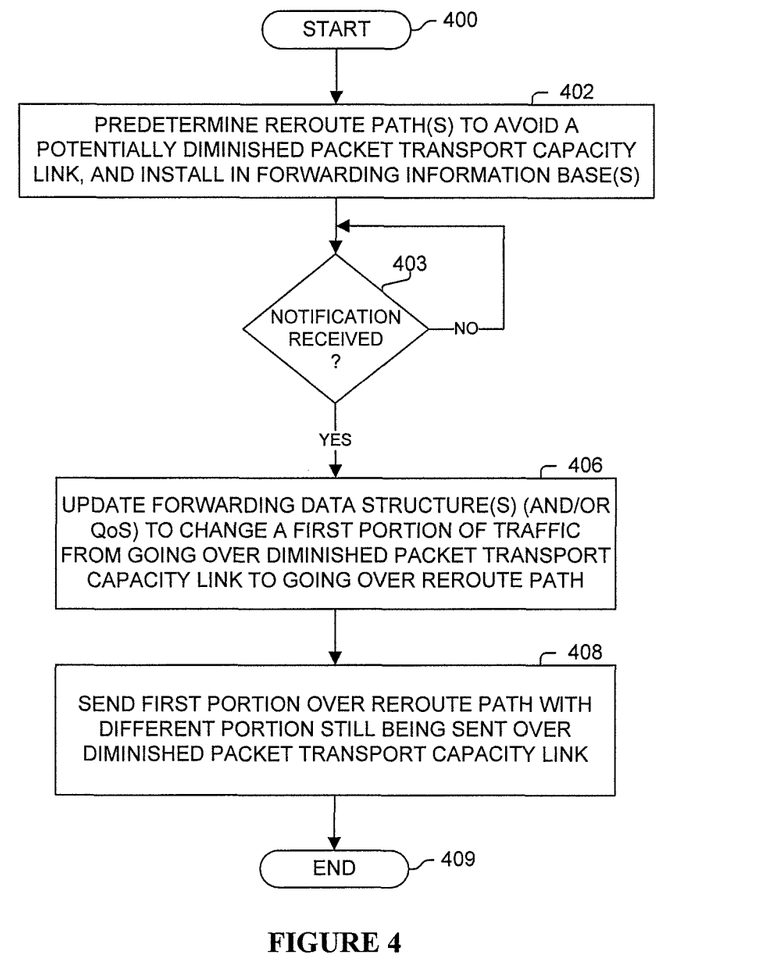
FIG. 4 illustrates a process according to one embodiment.

FIG. 4 illustrates a process performed in one embodiment. Processing begins with process block 400. In process block 402, one or more reroute paths are precomputed to avoid a potentially diminished packet transport capacity link. These precomputed path(s) are typically installed in corresponding forwarding data structures (e.g., forwarding information bases or FIBs) for fast rerouting.

As determined in process block 403, if a notification that a link has a diminished packet transport capacity has been received (e.g., a locally or remote link with the notification possibly received according to FIG. 3A or 3B), then in process block 406 one or more forwarding data structures are updated accordingly to change a first portion of the traffic from going over the diminished packet transport capacity link to a different path, while still forwarding a portion of the packet traffic over the diminished packet transport capacity link. In process block 408, packet traffic is forwarded according the forwarding information updated in process block 406. Processing of the flow diagram of FIG. 4 is complete as indicated by process block 409.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
receiving, by a packet switching device of a network, a notification that an adaptive bandwidth microwave link has a diminished packet transport capacity;
in response to said received notification, changing forwarding information within the packet switching device for a first portion of the packet traffic previously destined to go over the adaptive bandwidth microwave link to traverse one or more reroute paths not including the adaptive bandwidth microwave link; and
forwarding, by the packet switching device, the first portion of the packet traffic to traverse said one or more reroute paths not including the adaptive bandwidth microwave link based on said changed forwarding information, while continuing to forward a different portion of packet traffic over the adaptive bandwidth microwave link.

2. The method of claim 1, wherein the notification is directly received from a microwave communications device.

3. The method of claim 2, wherein the notification is received using ITU-T G.8013/Y.1731 protocol.

4. The method of claim 2, comprising: in response to said received notification, sending the notification in one or more routing protocol message to one or more other packet switching devices in the network.

5. The method of claim 1, wherein the notification is received in a routing protocol message flooded through the network.

6. The method of claim 5, wherein the routing protocol is an interior gateway protocol (IGP).

7. The method of claim 6, wherein the routing protocol is Intermediate System to Intermediate System (IS-IS) or Open Shortest Path First (OSPF).

8. The method of claim 5, comprising: adjusting one or more Quality of Service (QoS) policies based on said received notification.

9. The method of claim 1, comprising: adjusting one or more Quality of Service (QoS) policies based on said received notification.

10. The method of claim 1, wherein the first portion of the packet traffic does not include any high priority packet traffic.

11. The method of claim 1, wherein the first portion of the packet traffic includes best effort packet traffic.

12. The method of claim 1, comprising: predetermining said one or more reroute paths prior to said receiving the notification.

13. The method of claim 1, wherein the first portion of the packet traffic is identified by one or more prefixes.

14. A packet switching device, comprising:
one or more processing elements;
memory;
a plurality of interfaces configured to send and receive packets; and
one or more packet switching mechanisms configured to packet switch packets among said interfaces;
wherein said one or more processing elements are configured to perform operations, including in response to a received notification that a link has a diminished packet transport capacity, changing forwarding information for a first portion of the packet traffic to forward packet traffic previously destined to go over the diminished link to traverse one or more reroute paths not including the diminished link, with forwarding information remaining to continue to forward a different portion of the packet traffic one or more paths including the diminished link; and wherein one or more interfaces of the plurality of interfaces are configured to forward the first portion of the packet traffic based on said changed forwarding information to traverse said one or more reroute paths not including the diminished link, and to forward the different portion of the packet traffic over said one or more paths including the diminished link.

15. The packet switching device of claim 14, wherein the diminished link is an adaptive bandwidth microwave link.

16. The packet switching device of claim 15, wherein the notification was directly received from a microwave communications device.

17. The packet switching device of claim 14, wherein the notification was received in a routing protocol message flooded through the network.

18. The packet switching device of claim 14, wherein the first portion of the packet traffic does not include any high priority packet traffic.

19. The packet switching device of claim 14, wherein said operations include: predetermining said one or more reroute paths prior to said received notification being received by the packet switching device.

20. One or more non-transitory media encoding logic that includes instructions for execution, which when executed by a processor is operable to perform operations, comprising:
predetermining one or more reroute paths not including an adaptive bandwidth microwave link;
in response to a received notification that the adaptive bandwidth microwave link has a diminished packet transport capacity, changing forwarding information for a first portion of the packet traffic to forward packet traffic previously destined to go over the adaptive bandwidth microwave link to traverse a path of said one or more reroute paths, with forwarding information remaining to continue to forward a different portion of the packet traffic over the adaptive bandwidth microwave link.

* * * * *